United States Patent
Osumi et al.

(10) Patent No.: US 9,908,980 B2
(45) Date of Patent: Mar. 6, 2018

(54) FLUORINE RUBBER COMPOSITION, CROSSLINKED RUBBER MOLDED BODY AND METHOD FOR PRODUCING SAME

(71) Applicant: NIPPON VALQUA INDUSTRIES, LTD., Tokyo (JP)

(72) Inventors: Naoki Osumi, Gojo (JP); Sayaka Toda, Gojo (JP)

(73) Assignee: NIPPON VALQUA INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/107,368

(22) PCT Filed: Nov. 13, 2014

(86) PCT No.: PCT/JP2014/080027
§ 371 (c)(1),
(2) Date: Jun. 22, 2016

(87) PCT Pub. No.: WO2015/098338
PCT Pub. Date: Jul. 2, 2015

(65) Prior Publication Data
US 2017/0002153 A1 Jan. 5, 2017

(30) Foreign Application Priority Data
Dec. 27, 2013 (JP) ................................ 2013-272479

(51) Int. Cl.
C08J 3/00 (2006.01)
C08J 3/24 (2006.01)
C08J 7/12 (2006.01)
C08J 5/00 (2006.01)
C08L 27/16 (2006.01)
C09J 127/16 (2006.01)

(52) U.S. Cl.
CPC ................ C08J 3/247 (2013.01); C08J 5/00 (2013.01); C08J 7/123 (2013.01); C08L 27/16 (2013.01); C09J 127/16 (2013.01); C08J 2327/12 (2013.01); C08J 2327/16 (2013.01); C08L 2203/206 (2013.01); C08L 2205/02 (2013.01); C08L 2205/025 (2013.01); C08L 2312/00 (2013.01); C09J 2203/326 (2013.01)

(58) Field of Classification Search
CPC ..... C08J 3/247; C08J 5/00; C08J 7/123; C08J 127/16; C08J 2327/12; C08J 2327/16; C08J 2203/326; C08L 27/16; C08L 2203/206; C08L 2205/02; C08L 2205/025; C08L 2312/00
See application file for complete search history.

(56) References Cited

U.S. PATENT DOCUMENTS

| 4,094,949 | A | * | 6/1978 | Yokokawa et al. | ........ C08J 3/00 264/230 |
| 5,109,071 | A | * | 4/1992 | Johnson et al. | ........ C08L 27/12 525/193 |
| 6,160,053 | A | | 12/2000 | Enokida et al. | |
| 2006/0041069 | A1 | | 2/2006 | Sumi et al. | |
| 2009/0023863 | A1 | | 1/2009 | Kanega et al. | |
| 2009/0227726 | A1 | | 9/2009 | Stevens et al. | |
| 2010/0196709 | A1 | | 8/2010 | Yodogawa et al. | |
| 2011/0224358 | A1 | | 9/2011 | Stevens et al. | |
| 2012/0108753 | A1 | † | 5/2012 | Takemura | |

FOREIGN PATENT DOCUMENTS

| CN | 1703480 A | 11/2005 |
| CN | 101035840 A | 9/2007 |
| CN | 101868499 A | 10/2010 |
| EP | 1 816 162 A1 | 8/2007 |
| EP | 1 852 902 A1 | 11/2007 |
| EP | 2 765 159 A1 | 8/2014 |
| JP | 08-268245 A | 10/1996 |
| JP | 9-268245 A | 10/1997 |
| JP | 11-315180 A | 11/1999 |
| JP | 2000-119468 A † | 4/2000 |
| JP | 2000-230096 A | 8/2000 |
| JP | 2002-97329 A | 4/2002 |
| JP | 2004-134665 A | 4/2004 |
| JP | 2005-113035 A | 4/2005 |

(Continued)

OTHER PUBLICATIONS

International Search Report dated Feb. 17, 2015, issued in counterpart International Application No. PCT/JP2014/080027 (2 pages).
Office Action dated Jul. 17, 2017, issued in counterpart Chinese Application No. 201480070983.4, with English Translation. (16 pages).
Extended (supplementary) European Search Report dated Jul. 19, 2017, issued in counterpart European Application No. 14874562.3. (7 pages).

(Continued)

Primary Examiner — Nathan M Nutter
(74) Attorney, Agent, or Firm — Westerman, Hattori, Daniels & Adrian, LLP

(57) ABSTRACT

Provided are: a fluorine rubber composition which contains a hydrogen atom-containing fluorine rubber and a hydrogen atom-containing fluororesin; a crosslinked rubber molded body which uses this fluorine rubber composition; and a method for producing this crosslinked rubber molded body. It is preferable that the hydrogen atom-containing fluororesin is composed of at least one compound that is selected from the group consisting of polyvinylidene fluorides, vinylidene fluoride-hexafluoropropylene copolymers, tetrafluoroethylene-ethylene copolymers and vinylidene fluoride-hexafluoropropylene-tetrafluoroethylene copolymers.

10 Claims, No Drawings

(56) References Cited

FOREIGN PATENT DOCUMENTS

| JP | 2011-513554 A | 4/2011 |
| JP | 2013-189655 A | 9/2013 |
| WO | 2006/038424 A1 | 4/2006 |
| WO | 2011/002080 A1 | 1/2011 |

OTHER PUBLICATIONS

Notification of Forwarding of Notice of Opposition dated Nov. 20, 2017, issued in counterpart Japanese Application No. 2017-701018, with English translation (21 pages).

\* cited by examiner
† cited by third party

FLUORINE RUBBER COMPOSITION, CROSSLINKED RUBBER MOLDED BODY AND METHOD FOR PRODUCING SAME

TECHNICAL FIELD

The present invention relates to a fluorine rubber composition. The present invention also relates to a crosslinked rubber molded body, typified by a sealing material, including the fluorine rubber composition and a method for producing the crosslinked rubber molded body.

BACKGROUND ART

As sealing materials (e.g., a gasket and a packing) used in various applications, sealing materials made from fluorine rubbers are known. A fluorine rubber sealing material has relatively satisfactory heat resistance and plasma resistance (i.e., resistance to decomposition with plasma), and therefore has been used as a sealing material for use in a plasma etching device or a plasma CVD device constituting a semiconductor manufacturing device, such as a sealing material for maintaining a process chamber for treating a wafer therein in a vacuum state.

A fluorine rubber sealing material has also been used, for example, in a gate section that partitions between a chamber and a delivery section in a semiconductor manufacturing device. In this case, since compression and release of pressure are repeated in the gate section, the sealing material is required to have proper mechanical strength.

The mechanical strength of a fluorine rubber sealing material can be improved by adding an inorganic filler. However, when the sealing material containing the inorganic filler is used in a semiconductor manufacturing device as mentioned above, even if the fluorine rubber having excellent plasma resistance is used, the fluorine rubber component in the sealing material is often etched with plasma under a severe plasma environment. In this case, a problem may be caused that the inorganic filler contained in the fluoroelastomer is scattered in the chamber (particles are formed) and therefore the contamination of the chamber or the defect of a semiconductor product is likely to occur.

Japanese Patent Laying-Open No. 2000-119468 (PTD 1) discloses a fluorinated elastomer composition which does not contain a particulate filler that causes the formation of particles. Japanese Patent Laying-Open No. 2005-113035 (PTD 2) describes that the compounding amounts of a non-organic resin filler and an organic resin filler are reduced extremely in a fluorine rubber sealing material for the purpose of preventing the formation of particles.

CITATION LIST

Patent Document

PTD 1: Japanese Patent Laying-Open No. 2000-119468
PTD 2: Japanese Patent Laying-Open No. 2005-113035

SUMMARY OF INVENTION

Technical Problems

As described in PTD 1, when no filler is contained, although the problem of the formation of particles is not caused, a problem that it is difficult to impart high mechanical strength to a finished crosslinked rubber molded body still occur. PTD 2 describes that polytetrafluoroethylene (PTFE) is added as an organic resin-based filler for the purpose of securing mechanical strength and the like. However, according to the studies by the present inventors, it is found that, when a fluorine rubber sealing material containing PTFE as a reinforcing agent is kept using under plasma environments, PTFE particles are deposited on the surface of the etched sealing material and therefore the surface of the sealing material is whitened, although the problem of the formation of particles does not occur. The deposition (whitening) of a resin on the surface as mentioned above may cause a problem that agglomerates larger than particles fall out from the sealing material and therefore the contamination of a chamber or the defects of semiconductor products can occur.

An object of the present invention is to provide a fluorine rubber composition that enables the production of a crosslinked rubber molded body free from the problem of surface whitening as mentioned above even when then used under plasma environments and having excellent mechanical strength (hardness or a modulus). Another object of the present invention is to provide a crosslinked rubber molded body that is produced using the fluorine rubber composition, is free from the problem of surface whitening and has excellent mechanical strength and a method for producing the crosslinked rubber molded body.

Solutions to Problems

The present invention provides a fluorine rubber composition, a crosslinked rubber molded body and a method for producing the crosslinked rubber molded body as mentioned below.

[1] A fluorine rubber composition comprising a hydrogen atom-containing fluorine rubber and a hydrogen atom-containing fluororesin.

[2] The fluorine rubber composition according to [1], wherein a content of the hydrogen atom-containing fluororesin is 1 to 50 parts by weight relative to 100 parts by weight of the hydrogen atom-containing fluorine rubber.

[3] The fluorine rubber composition according to [1] or [2], wherein the fluorine rubber composition further comprises an organic peroxide and a co-crosslinking agent.

[4] The fluorine rubber composition according to any of [1] to [3], wherein the hydrogen atom-containing fluororesin is at least one compound selected from the group consisting of polyvinylidene fluoride, a vinylidene fluoride-hexafluoropropylene copolymer, a tetrafluoroethylene-ethylene copolymer and a vinylidene fluoride-hexafluoropropylene-tetrafluoroethylene copolymer.

[5] The fluorine rubber composition according to any of [1] to [4], wherein the fluorine rubber composition contains no inorganic filler.

[6] A crosslinked rubber molded body comprising a crosslinked product of the fluorine rubber composition according to any of [1] to [5].

[7] The crosslinked rubber molded body according to [6], wherein the crosslinked rubber molded body is a sealing material for semiconductor manufacturing devices.

[8] A method for producing a crosslinked rubber molded body, the method comprising a step of crosslinking and molding the fluorine rubber composition according to any of [1] to [5].

[9] A method for producing a crosslinked rubber molded body, the method comprising:
 a first crosslinking step of partially crosslinking the fluorine rubber composition according to any of [1] to [5] to produce a first crosslinked product that is capable of being molded; and
 a second crosslinking step of crosslinking the first crosslinked product with an ionizing radiation to produce a second crosslinked product.

[10] The production method according to [9], wherein the production method further comprises a molding step of molding the first crosslinked product between the first crosslinking step and the second crosslinking step.

[11] The production method according to [10], wherein the first crosslinked product is molded by extrusion molding or injection molding.

[12] The production method according to any of [9] to [11], wherein the fluorine rubber composition is crosslinked with heat in the first crosslinking step.

Advantageous Effects of Invention

According to the present invention, it is possible to provide a fluorine rubber composition that enables the production of a crosslinked rubber molded body free from the problem of surface whitening even when used under plasma environments and having excellent mechanical strength. The resulting crosslinked rubber molded body is free from the problem of surface whitening and has excellent mechanical strength, and therefore can be used suitably as a sealing material, e.g., a packing or a gasket, particularly for semiconductor manufacturing devices.

DESCRIPTION OF EMBODIMENTS

<Fluorine Rubber Composition>
[a] Hydrogen Atom-Containing Fluorine Rubber
The hydrogen atom-containing fluorine rubber to be used in the present invention is a crosslinkable rubber component that can be formed into an elastomer (a crosslinked rubber) having a crosslinked structure through a crosslinking reaction, and is a polymer or copolymer that contains a monomer containing a hydrogen atom or containing a hydrogen atom and a fluorine atom as at least one constituent unit or a fluorine-containing thermoplastic elastomer containing a hydrogen atom. The term "a crosslinked rubber" is a rubber that is produced by causing a crosslinking reaction between molecule chains of a crosslinkable rubber component (a hydrogen atom-containing fluorine rubber) with a crosslinking agent or the like to form a crosslinked structure, and exhibits rubbery elasticity.

Specific examples of the hydrogen atom-containing fluorine rubber may include a vinylidene fluoride (VDF)-hexafluoropropylene (HFP) copolymer, a vinylidene fluoride (VDF)-hexafluoropropylene (HFP)-tetrafluoroethylene (TFE) copolymer, a tetrafluoroethylene (TFE)-propylene (Pr) copolymer, a vinylidene fluoride (VDF)-propylene (Pr)-tetrafluoroethylene (TFE) copolymer, an ethylene (E)-tetrafluoroethylene (TFE)-perfluoromethyl vinyl ether (PMVE) copolymer, a vinylidene fluoride (VDF)-tetrafluoroethylene (TFE)-perfluoromethyl vinyl ether (PMVE) copolymer, and a vinylidene fluoride (VDF)-perfluoromethyl vinyl ether (PMVE) copolymer. As the hydrogen atom-containing fluorine rubber, only one-type may be used or a combination of two or more types may be used.

The fluorine-containing thermoplastic elastomer containing a hydrogen atom is not particularly limited, and "DAI-EL Thermoplastic" (trade name; manufactured by Daikin Industries, Ltd.), "CEFRAL SOFT" (trade name; manufactured by Central Glass Co., Ltd.) and the like can be used.

The hydrogen atom-containing fluororesin to be used in the present invention is a resin containing a hydrogen atom and a fluorine atom in the molecule thereof, and may be polyvinylidene fluoride (PVDF), a vinylidene fluoride (VDF)-hexafluoropropylene (HFP) copolymer, a tetrafluoroethylene-ethylene copolymer (ETFE), a chlorotrifluoroethylene-ethylene copolymer (ECTFE), polyvinyl fluoride (PVF), a vinylidene fluoride-hexafluoropropylene-tetrafluoroethylene copolymer (VDF-HFP-TFE copolymer) or the like. As the hydrogen atom-containing fluororesin, only one type may be used or a combination of two or more types may be used.

Among the above-mentioned compounds, at least one compound selected from the group consisting of polyvinylidene fluoride (PVDF), a vinylidene fluoride (VDF)-hexafluoropropylene (HFP) copolymer, a tetrafluoroethylene-ethylene copolymer (ETFE) and a vinylidene fluoride-hexafluoropropylene-tetrafluoroethylene copolymer (VDF-HFP-TFE copolymer) is preferably used, because these compounds are hardly deposited on the surface of a crosslinked rubber molded body and have a high reinforcing effect.

Particularly a fluorine rubber composition containing a VDF-HFP copolymer as the hydrogen atom-containing fluororesin is advantageous, because it becomes possible to produce a crosslinked rubber molded body having excellent rubbery elasticity (smaller hardness and a smaller modulus) while maintaining excellent tensile strength thereof. This advantage is particularly prominent in the case where the crosslinked rubber molded body is produced by the below-mentioned method involving: a first crosslinking step of partially crosslinking the fluorine rubber composition to produce a first crosslinked product that is capable of being molded; and a second crosslinking step of crosslinking the first crosslinked product with an ionizing radiation to produce a second crosslinked product.

As the VDF-HFP copolymer, a commercially available product may be used. Examples of the commercially available product of the VDF-HFP copolymer may include "Kynar UltraFlex B" (trade name; manufactured by Arkema) and "Kynar ADS2" (trade name: manufactured by Arkema).

The content of the hydrogen atom-containing fluororesin (when two or more hydrogen atom-containing fluororesins are used, the total content of the hydrogen atom-containing fluororesins) in the fluorine rubber composition is preferably 1 to 50 parts by weight, more preferably 5 to 20 parts by weight, still more preferably 10 to 20 parts by weight, relative to 100 parts by weight of the hydrogen atom-containing fluorine rubber.

The content of the hydrogen atom-containing fluororesin of greater than or equal to 1 part by weight is advantageous for improving the mechanical strength (hardness or a modulus) of a crosslinked rubber molded body (e.g., a sealing material) produced from the composition. When the content is less than or equal to 50 parts by weight, it becomes possible to achieve both good mechanical strength and good heat resistance (compressive permanent strain properties). If the content of the hydrogen atom-containing fluororesin is more than 50 parts by weight, the content of the hydrogen atom-containing fluorine rubber that exhibits elasticity is decreased in accordance with the increase in the content of the hydrogen atom-containing fluororesin and therefore heat resistance (compressive permanent strain properties) is deteriorated. If the content of the hydrogen atom-containing fluororesin is more than 50 parts by weight, it is likely that the deposition of the hydrogen atom-containing fluororesin on the surface under plasma environments cannot be prevented effectively.

As mentioned above, the fluorine rubber composition according to the present invention contains the hydrogen atom-containing fluorine rubber and the hydrogen atom-containing fluororesin, and therefore it becomes possible to suppress the problem of the deposition of the fluororesin on the surface (i.e., surface whitening) which may occur when the crosslinked rubber molded body is used under plasma environments. The reasons for this advantage are considered as follows. The fluorine rubber component in the crosslinked rubber molded body (a sealing material) tends to be etched gradually, but in a small amount, by plasma when the crosslinked rubber molded body is used under a plasma environment. When the hydrogen atom-containing fluororesin, which has a similar structure (e.g., a similar fluorine atom content, a similar hydrogen atom content) to that of the hydrogen atom-containing fluorine rubber, is used, the plasma resistance of the hydrogen atom-containing fluororesin becomes also similar to that of the hydrogen atom-containing fluorine rubber, and the hydrogen atom-containing fluororesin is etched, decomposed and gasified at the same level as that of the etching, decomposition and gasification of the fluorine rubber component. If a perfluororesin such as PTFE is used, on the contrary, it is considered that the perfluororesin is hardly decomposed by etching as compared with the hydrogen atom-containing fluorine rubber and is therefore gradually deposited on the surface of the crosslinked rubber molded body.

According to the fluorine rubber composition of the present invention, it is possible to provide a crosslinked rubber molded body having excellent mechanical strength. It is considered that this is because the structure of the hydrogen atom-containing fluororesin is similar to that of the hydrogen atom-containing fluorine rubber and therefore the hydrogen atom-containing fluororesin has high compatibility with the hydrogen atom-containing fluorine rubber, and consequently the reinforcing effect by the hydrogen atom-containing fluororesin is increased. Furthermore, according to the fluorine rubber composition of the present in it is also possible to provide a crosslinked rubber molded body having god elongation properties. It is considered that this is because the crosslinked rubber molded body is composed of a bicontinuous phase made from the hydrogen atom-containing fluorine rubber and the hydrogen atom-containing fluororesin which are highly compatible with each other.

The crosslinking system for the hydrogen atom-containing fluorine rubber may be a peroxide crosslinking system, a polyamine crosslinking system, a polyol crosslinking system or the like. Among these crosslinking systems, a peroxide crosslinking system is preferred, because it becomes possible to provide a crosslinked rubber molded body (e.g., a sealing material) that has higher heat resistance and plasma resistance and can be used suitably for semiconductor manufacturing devices.

The organic peroxide (i.e., a peroxide crosslinking agent) to be used in the peroxide crosslinking system may be 2,5-dimethyl-2,5-di(t-butylperoxy)hexane (an example of a commercially available product: "Perhexa 25B" manufactured by NOF Corporation), dicumyl peroxide (an example of a commercially available product: "PERCUMYL D" manufactured by NOF Corporation), 2,4-dichlorobenzoyl peroxide, di-t-butyl peroxide, t-butyldicumyl peroxide, benzoyl peroxide (an example of a commercially available product: "NYPER B" manufactured by NOF Corporation), 2,5-dimethyl-2,5-(t-butylperoxy)hexyne-3 (an example of a commercially available product: "PERHEXYNE 25B" manufactured by NOF Corporation), 2,5-dimethyl-2,5-di(benzoylperoxy)hexane, α,α'-bis(t-butylperoxy-m-isopropyl)benzene (an example of a commercially available product: "PERBUTYL P" manufactured by NOF Corporation), t-butylperoxyisopropyl carbonate, parachlorobenzoyl peroxide or the like. As the peroxide crosslinking agent, only one-type may be used or a combination of two or more types may be used.

The content of the organic peroxide (when two or more organic peroxides are used, the total content of the organic peroxides) in the fluorine rubber composition is, for example, 0.01 to 20 parts by weight, preferably 0.1 to 10 parts by weight, relative to 100 parts by weight of the hydrogen atom-containing fluorine rubber.

Examples of a co-crosslinking agent to be used in the peroxide crosslinking system may include compounds capable of co-crosslinking by the action of radical (i.e., unsaturated polyfunctional compounds), such as triallyl isocyanurate (an example of a commercially available product: "TAIC", manufactured by Nihon Kasei Co., Ltd.), triallyl cyanurate, triallyl formal, triallyl trimellitate, N,N'-m-phenylenebismaleimide, dipropargyl terephthalate, diallyl phthalate and tetraallyl terephthalamide. As the co-crosslinking agent, only one-type may be used, or a combination of two or more types may be used. Among these compounds, the co-crosslinking agent preferably contains triallyl isocyanurate, from the viewpoint of the reactivity of the compound and the heat resistance of a crosslinked rubber molded body produced from the fluorine rubber composition.

The content of the co-crosslinking agent (when two or more co-crosslinking agents are used, the total content of the co-crosslinking agents) in the fluorine rubber composition is, for example, 0.1 to 40 parts by weight, preferably 0.2 to 10 parts by weight, relative to 100 parts by weight of the hydrogen atom-containing fluorine rubber.

The fluorine rubber composition according to the present invention can optionally contain an additive such as an anti-aging agent, an antioxidant agent, a vulcanization accelerator, a processing aid (e.g., a liquid rubber, an oil, a plasticizer, a softening agent, a tackifier), a stabilizer, a silane coupling agent, a flame retardant agent, a mold release agent, a wax and a lubricant, for the purpose of improving processability, modulating physical properties and the like. As the additive, only one-type may be used, or a combination of two or more types may be used.

When it is intended to use the crosslinked rubber molded body (e.g., a sealing material) for a semiconductor manufacturing device, it is preferred that the amount of the additive is as small as possible (e.g., less than or equal to 10 parts by weight, preferably less than or equal to 5 parts by weight, more preferably less than or equal to 2 parts by weight, still more preferably less than or equal to 1 part by weight, relative to 100 parts by weight of the hydrogen atom-containing fluorine rubber), and it is desirable that no additive is contained, because the contamination during the production process or the decrease in production efficiency of the semiconductor may be caused by the evaporation, elution or deposition of the additive.

The fluorine rubber composition according to the present invention can optionally contain a filler such as carbon black, silica, alumina, zinc oxide, titanium oxide, clay, talc, diatomaceous earth, barium sulfate, calcium carbonate, magnesium carbonate, calcium oxide, mica, graphite, aluminum hydroxide, aluminum silicate, hydrotalcite, a metal powder, a glass powder or a ceramic powder.

Among these fillers, particularly an inorganic filler can cause the formation of particles, as mentioned above. Therefore, when it is intended to use the crosslinked rubber molded body (sealing material) in a semiconductor manufacturing device, it is preferred that the amount of an inorganic filler is as small as possible (e.g., less than or equal to 10 parts by weight, preferably less than or equal to 5 parts by weight, more preferably less than or equal to 2 parts by weight, still more preferably less than or equal to 1 part by weight, relative to 100 parts by weight of the hydrogen atom-containing fluorine rubber), and it is desirable to add no inorganic filler. The term "an inorganic filler" refers to a filler containing a metal element (e.g., Ba, Ti, Zn, Al, Mg, Ca, Si).

The fluorine rubber composition according to the present invention can be prepared by kneading the hydrogen atom-containing fluorine rubber, the hydrogen atom-containing fluororesin, the crosslinking agents (such as organic peroxide and co-crosslinking agent) and other optional compounding agents homogeneously. As a kneading machine, any conventionally known one, such as a mixing roll (e.g., an open roll) and a mixer (e.g., a kneader or a Bumbary mixer), can be used. It is possible to knead these compounding agents in one step. Alternatively, it is also possible to knead these compounding agents in several steps in such a manner that firstly some of the compounding agents are kneaded and subsequently the remainders of the compounding agents are kneaded.

As for the kneading of the hydrogen atom-containing fluorine rubber with the hydrogen atom-containing fluororesin, the following methods can be employed: (1) a method in which a powder of the hydrogen atom-containing fluorine rubber is kneaded with a powder of the hydrogen atom-containing fluororesin with a mixing roll; (2) a method in which a powder or pellet of the hydrogen atom-containing fluorine rubber is melt-kneaded with a powder or pellet of the hydrogen atom-containing fluororesin with a mixer and the like.

<Crosslinked Rubber Molded Body and Method for Production Thereof>

The crosslinked rubber molded body according to the present invention is a crosslinked product of the above-mentioned fluorine rubber composition. Therefore, the crosslinked rubber molded body rarely undergoes the deposition of the fluororesin on the surface thereof (surface whitening) even when used under plasma environments, and has excellent mechanical strength. Furthermore, the crosslinked rubber molded body can exhibit good elongation properties and heat resistance (compressive permanent strain properties).

The crosslinked rubber molded body may be typically a sealing material such as a packing and a gasket. The shape of the sealing material is selected appropriately depending on the intended use thereof. A typical example of the sealing material is an O-ring having an O-shaped cross section. The sealing material according to the present invention has good physical properties as mentioned above, and therefore can be used particularly suitably as a sealing material for semiconductor manufacturing devices.

The crosslinked rubber molded body can be produced by the crosslinking and molding (vulcanization molding) of the fluorine rubber composition. The crosslinking and molding can be carried out by pre-molding the fluorine rubber composition if necessary and then press-molding the pre-formed product using a mold. The molding temperature is, for example, about 150 to 220° C. According to the circumstances, the molding may be carried out by feed press molding, injection molding, extrusion molding or the like. If necessary, secondary crosslinking may be carried out at a temperature of about 150 to 280° C. after the vulcanization molding. When an additional crosslinking step with an ionizing radiation is carried out after the vulcanization molding, compressive permanent strain properties can be increased even if a hydrogen atom-containing, fluororesin having a relatively low melting point is used.

As the method for producing the crosslinked rubber molded body, a production method involving the following steps can be mentioned.

(1) A first crosslinking step of partially crosslinking the fluorine rubber composition to produce a first crosslinked product that is capable of being molded; and (2) a second crosslinking step of crosslinking the first crosslinked product with an ionizing radiation to produce a second crosslinked product.

It is preferred that the production method further involves (3) a molding step of molding, the first crosslinked product between the first crosslinking step and the second crosslinking step.

In conventional methods for producing a crosslinked rubber molded body, there are the following problems:

(a) a crosslinking reaction is essential for molding the molded body into a desired shape, and therefore the conventional methods are not suitable for continuous molding such as extrusion molding or injection molding and it is difficult to produce the molded body continuously by a continuous molding process; and (b) when once a crosslinked structure is formed to fix the shape of the molded body, because a crosslinking reaction is irreversible, the molded body cannot be melted even when heated and the shape of the molded body is also irreversible; therefore even if there is found any defect in the shape given after molding, it is impossible to carry out the molding step again re-using the material after the molding. Therefore, it has been considered that the improvement in production efficiency is hardly achieved by the conventional methods.

According to the production method involving the above-mentioned steps, in contrast, it is possible to carry out a continuous molding process by melt molding and to re-use the material in the molding step while maintaining the effect achieved by the use of the fluorine rubber composition, and therefore it is possible to improve the production efficiency. Hereinbelow, each of the steps will be described in detail.

(1) First Crosslinking Step

In this step, the fluorine rubber composition is partially crosslinked with at least one of the above-mentioned crosslinking systems (preferably a peroxide crosslinking system) to produce a first crosslinked product that is capable of being molded. The wording "partially crosslinking" refers to such a state that the crosslinking degree in the crosslinked product is higher than that in an uncrosslinked product but is less than a crosslinking degree that is required for a final product due to the shortage of a crosslinking agent (including a crosslinking aid such as a co-crosslinking agent), the deactivation of a crosslinking agent (including a crosslinking aid such as a co-crosslinking agent), the inhibition of crosslinking, the shortage of the dose of an ionizing radiation or the like, or such a state that the crosslinking degree in the crosslinked product is still less than a crosslinking degree that is required for a final product even by further heating the rubber composition or further irradiating the rubber composition with an ionizing radiation in spite of a fact that a crosslinking agent (including a crosslinking aid such as a co-crosslinking agent) is remained in the rubber composition.

More specifically, in this step, it is preferred that the rubber composition is partially crosslinked in such a manner that, when a vulcanization curve for the rubber composition is obtained with a curelastometer (a rheometer; a vulcanization/hardened properties tester) wherein the horizontal axis represents times and the longitudinal axis represents torque values, the maximum torque value MH becomes 2 to 70% of the maximum torque value $MH_0$ in a reference system. The maximum torque value MH is more preferably 3 to 40% of $MH_0$.

The term "a reference system" refers to a rubber composition which contains a sufficient amount of a crosslinking agent (including a crosslinking aid such as a co-crosslinking agent) and can form a crosslinked product having the maximum crosslinking degree that the crosslinked product can have upon the application of a proper amount of heat to the rubber composition. The crosslinked product is more specifically a crosslinked product in which the crosslinking has proceeded to such an extent that the crosslinked product cannot be molten even when heated to, under an air atmosphere, a temperature at which the crosslinked part is decomposed. With regard to the reference system, the sufficient amount of a crosslinking agent in each crosslinking system and the crosslinking temperature and the crosslinking time required for achieving the maximum crosslinking degree that the rubber composition can have can be selected based on the common technical knowledge in the art. The temperature at which the crosslinked part is decomposed is, for example, about 200° C. for a fluorine rubber that is crosslinked with a peroxide crosslinking system and about 230° C. for a fluorine rubber that is crosslinked with a polyol crosslinking system.

In this step, the fluorine rubber composition in an uncrosslinked state is crosslinked until the resultant crosslinked product becomes in a moldable state. The wording "capable of being molded" or "moldable" refers to a matter that a material can be molded and a molded product can maintain the molded shape thereof after the molding processing. If the fluorine rubber composition remains uncrosslinked, the fluidability of the fluorine rubber composition is too high and cannot be molded. If the crosslinking degree in the fluorine rubber composition is too high, on the other hand, the setting of the shape by crosslinking has already proceeded excessively, and therefore the crosslinked product can be hardly molded and cannot be melted with heat.

The crosslinking method employed in this step may be a crosslinking method with heat, a crosslinking method with an ionizing radiation, or a combination thereof. In the case of the crosslinking with heat, the partial crosslinking can be achieved by reducing the amount of the crosslinking agent and/or the crosslinking aid as compared with that in the reference system or by adding an additive that inhibits the crosslinking to the fluorine rubber composition. The degree of the crosslinking can be controlled by controlling the amount of the crosslinking agent and/or the crosslinking aid to be added or the amount of the crosslinking inhibitor to be added. In the case where the crosslinking is carried out by irradiation of an ionizing radiation, although the crosslinking tends to occur partially even when the irradiation dose is adequately large, the degree of the crosslinking can be controlled by controlling the irradiation dose.

Examples of the additive that inhibits the crosslinking include 2,2-bis(4-hydroxyphenyl)hexafluoropropane, o-phenyl phenol, hydroquinone, 2,4-diphenyl-4-methyl-1-pentene, 2,2-bis(3-amino-4-hydroxyphenyl)hexafluoropropane an amine-ketone-type anti-aging agent (e.g., poly(2,2,4-trimethyl-1,2-dihydroquinoline)), an aromatic secondary amine-type anti-aging agent (e.g. 4,4'-bis(α,α-dimethylbenzyl)diphenylamine), a monophenol-type anti-aging agent (e.g., 2,6-di-t-butyl-4-methylphenol), a bisphenol-type anti-aging agent (e.g., 4,4'-thiobis(3-methyl-6-t-butylphenol) and a benzimidazole-type anti-aging agent (e.g., 2-mercaptobenzimidazole).

As the crosslinking method in this step, a crosslinking method with heat is preferably employed from the viewpoint of the prevention of the increase in production cost.

In the case where the first crosslinked product is produced with an ionizing radiation, electron beam or γ-ray can be used as the ionizing radiation, as in the case in the below-mentioned second crosslinking step.

(2) Molding Step

It is preferred that a molding step of molding the first crosslinked product is carried out subsequent to the first crosslinking step. Since the first crosslinked product is a material that is partially crosslinked to a moldable level, the first crosslinked product can be melted with heat and therefore can be molded continuously by melt molding such as extrusion molding or injection molding. By employing the continuous molding, it becomes possible to produce the crosslinked rubber molded body continuously and consequently reduce the production cost.

When the first crosslinked product is in such a state that the crosslinking of the first crosslinked product with heat cannot proceed any more due to the shortage of the crosslinking agent or the crosslinking aid or the like, searching in which the crosslinking proceeds with heat hardly occur, unlike conventional crosslinked rubber molded body production methods. This phenomenon is also advantageous for the continuous molding by melt molding such as extrusion molding or injection molding.

The first crosslinked product can be melted with heat. Therefore, in particular, when the first crosslinked product is in such a state that the crosslinking of the first crosslinked product with heat cannot proceed any more due to the shortage of the crosslinking agent or the crosslinking aid or the like, if there is found any defect in the shape of the product after molding, the material after molding can be re-used (for example, the molded product is melted with heat and the melted product is subjected to the molding step again). This re-use of the material is also advantageous for the reduction in the production cost.

The melt molding (extrusion molding or injection molding) of the first crosslinked product can be carried out in the same manner as in the melt molding of a general thermoplastic resins or thermoplastic elastomers. The molding temperature may be, for example, 150 to 320° C.

(3) Second Crosslinking Step

In this step, the first crosslinked product or a molded body thereof is crosslinked with an ionizing radiation to impart a crosslinking degree required for the final product, thereby producing a second crosslinked product. The ionizing radiation is not particularly limited, and electron beam or γ-ray can be used preferably. The irradiation dose of the ionizing radiation is preferably 10 to 500 kGy, more preferably 30 to 200 kGy. If the irradiation dose is less than 10 kGy, it is likely that a sufficient crosslinking degree is not achieved and desired mechanical strength does not tend to be achieved. On the other hand, when the irradiation dose is less than or equal to 500 kGy, the melting of the hydrogen atom-containing fluororesin can be prevented and a second crosslinked product (a crosslinked rubber molded body)

having excellent elongation properties can be produced. When this crosslinking step with an ionizing radiation is carried out, even when a hydrogen atom-containing fluororesin having a relatively low melting point is used, compressive permanent strain properties can be improved satisfactorily.

If necessary, subsequent to the second crosslinking step, the second crosslinked product may be subjected to a heat treatment with an oven (e.g., an electric furnace, a vacuum electric furnace) or the like. The condition for the heat treatment is about 150 to 280° C.

EXAMPLES

Hereinbelow, the present invention will be described in more detail by way of Examples and Comparative Examples. However, the present invention is not intended to be limited to these Examples.

Examples 1 to 4, Comparative Example 1 to 5

In accordance with the compounding, compositions shown in Table 1 (wherein the unit for each compounding amount is part(s) by weight), predetermined amounts of compounding agents were kneaded with an open roll. Subsequently, the resultant fluorine rubber composition was press-molded under the conditions of 170° C. for 20 minutes, and was then subjected to a heat treatment under the conditions of 200° C. for 4 hours, thereby producing a sealing material (an O-ring).

atom-containing fluorine rubber and a hydrogen atom-containing fluororesin were kneaded at 230° C. with a kneader, and then the resultant product was kneaded with predetermined amounts of a crosslinking agent and a co-crosslinking agent to produce a kneaded product. The kneaded product was subjected to crosslinking with heat under the conditions of 200° C. for 15 minutes to produce a first crosslinked product (a first crosslinking step). Subsequently, the first crosslinked product was extrusion-molded at 230° C. to produce a molded body having a shape of a sealing material (an O-ring) (a molding step). The extrusion molding (melt molding) into the shape of the sealing material was performed easily. Subsequently, the molded product was irradiated with a radioactive ray (γ-ray) at an irradiation dose of 80 kGy to produce a sealing material (an O-ring) which was a second crosslinked product (a crosslinked rubber molded body) (a second crosslinking step). The first crosslinked product exhibited heat-meltable properties, and therefore a molded body thereof could be melted with heat or re-molded easily.

In Example 1, the sealing material was not melted when heated to 200° C. under an air atmosphere, and the kneaded product (i.e., a material which was not press-molded yet) contained sufficient amounts of the crosslinking agent and the co-crosslinking agent, and was applied with a sufficient amount of heat for causing crosslinking. Therefore, the kneaded product can be deemed as the above-mentioned reference system. The vulcanization curve (200° C., 15 minutes) in the reference system and the vulcanization curve (200° C., 15 minutes) in the first crosslinking step in Example 5 were determined with a curelastometer (manu-

TABLE 1

| | | Examples | | | | Comparative Examples | | | | |
|---|---|---|---|---|---|---|---|---|---|---|
| | | 1 | 2 | 3 | 4 | 1 | 2 | 3 | 4 | 5 |
| Hydrogen atom-containing fluorine rubbers | FKM 1 | 100 | 100 | 100 | 100 | 100 | 100 | 100 | 100 | 100 |
| Hydrogen atom-containing fluororesins | PVDF | 10 | 20 | | | | | | | |
| | ETFE | | | 10 | 20 | | | | | |
| Perfluororesins | PTFE | | | | | | | 10 | 20 | |
| | FEP | | | | | | | | 10 | 10 |
| Crosslinking agent | | 1 | 1 | 1 | 1 | 1 | 1 | 1 | 1 | 1 |
| Co-crosslinking agent | | 4 | 4 | 4 | 4 | 4 | 4 | 4 | 4 | 4 |
| Harness | shoreA | 63 | 75 | 61 | 67 | 54 | 66 | 72 | 60 | 67 |
| Tensile strength | MPa | 13.7 | 17.7 | 4.6 | 6.8 | 5.8 | 10.6 | 13.4 | 12.9 | 12.4 |
| Breaking elongation | % | 340 | 290 | 260 | 250 | 370 | 400 | 410 | 435 | 430 |
| 100% Modulus | MPa | 2.0 | 4.2 | 1.8 | 2.7 | 1.2 | 2.2 | 3.5 | 1.4 | 1.8 |
| Evaluation of deposition on surface | | No | No | No | No | No | Yes | Yes | Yes | Yes |
| Weight loss | % | 6.9 | 7.0 | 5.8 | 7.1 | 5.7 | 9.0 | 9.5 | 7.4 | 8.4 |

Examples 5 to 9, Comparative Examples 6 to 8

In accordance with the compounding compositions shown in Table 2 (wherein the unit for each compounding amount is part(s) by weight), predetermined amounts of a hydrogen factured by Orientec Co., Ltd.), and then the maximum torque value $MH_0$ in the reference system and the maximum torque value MH in Example 5 were determined. The maximum torque value MH was 10.1% when the maximum torque value $MH_0$ was defined as 100%.

TABLE 2

| | | Examples | | | | | Comparative Examples | | |
|---|---|---|---|---|---|---|---|---|---|
| | | 5 | 6 | 7 | 8 | 9 | 6 | 7 | 8 |
| Hydrogen atom-containing fluorine rubbers | FKM 2 | 70 | 70 | 70 | 70 | 70 | 70 | 70 | 70 |
| | FKM 3 | 30 | 30 | 30 | 30 | 30 | 30 | 30 | 30 |

TABLE 2-continued

|  |  | Examples ||||| Comparative Examples |||
|---|---|---|---|---|---|---|---|---|---|
|  |  | 5 | 6 | 7 | 8 | 9 | 6 | 7 | 8 |
| Hydrogen atom-containing fluororesins | PVDF | 10 | 15 |  |  |  |  |  |  |
|  | ETFE |  |  | 10 | 15 |  |  |  |  |
|  | VDF-HFP |  |  |  |  | 15 |  |  |  |
| Perfluororesins | PTFE |  |  |  |  |  |  | 10 | 15 |
|  | FEP |  |  |  |  |  |  |  |  |
| Crosslinking agent |  | 0.03 | 0.03 | 0.03 | 0.03 | 0.03 | 0.03 | 0.03 | 0.03 |
| Co-crosslinking agent |  | 4 | 4 | 4 | 4 | 4 | 4 | 4 | 4 |
| First crosslinking step |  | Crosslinking with heat ||||||||
| Molding step |  | Extrusion molding (230° C.) ||||||||
| Second crosslinking step |  | Crosslinking with radioactive ray (80 kGy) ||||||||
| Harness | shoreA | 71 | 81 | 71 | 78 | 70 | 63 | 73 | 76 |
| Tensile strength | MPa | 10.8 | 16.4 | 10.1 | 12.9 | 17.2 | 6.7 | 7.8 | 10.2 |
| Breaking elongation | % | 150 | 180 | 170 | 160 | 170 | 170 | 180 | 160 |
| 100% Modulus | MPa | 5.7 | 8.4 | 3.8 | 5.6 | 4.5 | 2.5 | 5.0 | 7.1 |
| Evaluation of deposition on surface |  | No | No | No | No | No | No | Yes | Yes |
| Weight loss | % | 7.4 | 7.5 | 6.1 | 6.8 | 7.4 | 6.1 | 9.6 | 9.9 |
| Compressive permanent strain | % | 27 | 29 | 30 | 32 | 27 | 25 | 31 | 32 |

The details of the compounding agent used in Examples and Comparative Examples are as follows.

[1] FKM 1: a vinylidene fluoride (VDF)-hexafluoropropylene (HFP)-tetrafluoroethylene (TFE) polymer ["Daiel G902": manufactured by Daikin Industries, Ltd.].

[2] FKM 2: a vinylidene fluoride (VDF)-hexafluoropropylene (HFP)-tetrafluoroethylene (TFE) polymer ["TECNOFLON P959": manufactured by Solvay Specialty Polymers].

[3] FKM 3: a fluorine-containing thermoplastic elastomer that is a block polymer of a vinylidene fluoride (VDF)-hexafluoropropylene (HFP)-tetrafluoroethylene (TFE) polymer with a tetrafluoroethylene-ethylene polymer (ETFE) ["Daiel Thermoplastic T-530"; manufactured by Daikin Industries, Ltd.].

[4] PVDF: polyvinylidene fluoride ["Kureha KF polymer #850"; manufactured by Kureha Corporation].

[5] ETFE: a tetrafluoroethylene-ethylene copolymer ["NEOFLON EP610"; manufactured by Daikin Industries, Ltd.].

[6] VDF-HFP: a vinylidene fluoride-hexafluoropropylene copolymer ["Kynar UltraFlex B"; manufactured by Arkema].

[7] PTFE: polytetrafluoroethylene ["Zonyl MP1500"; manufactured by Du Pont-Mitsui Fluorochemicals Co., Ltd.],

[8] FEP: a tetrafluoroethylene-hexafluoropropylene copolymer ["NEOFLON NC1500"; manufactured by Daikin Industries, Ltd.].

[9] crosslinking agent: Perhexa 25B (2,5-dimethyl-2,5-di(t-butylperoxy)hexane) ["Perhexa 25B": manufactured by NOF Corporation].

[10] co-crosslinking agent: triallyl isocyanurate ["TAIC"; manufactured by Nihon Kasei Co., Ltd.].

(Evaluation of Sealing Materials)

The sealing materials produced above were measured and evaluated with respect to the following items. The results are shown in Table 1 and Table 2.

[a] Mechanical Properties of Sealing Materials

A sheet having a thickness of 2 mm was produced in accordance with JIS K6250, and a dumbbell-shaped No. 3 type test piece was punched out from the sheet in accordance with JIS K6251. The test piece was drawn at 500 mm/min, and was then measured with respect to tensile strength, breaking elongation and a 100% modulus. The hardness of the sheet was also measured in accordance with JIS K6253 with a type-A durometer hardness tester. All of these tests were carried out at 25° C.

[b] Condition of Surface After Irradiation with Plasma

A sealing material was irradiated with plasma under the conditions of an output of 1000 W, an irradiated time of 6 hours, a vacuum degree of 1 Torr and a gas ratio: $O_2:CF_4=190:10$, and then the surface of the sealing material was observed with naked eyes to confirm the presence or absence of the deposition of the resin (surface whitening).

[c] Weight Loss Caused by Irradiation with Plasma

The weight W0 of a sealing material before the irradiation with plasma under the above-mentioned conditions and the weight W1 of the sealing material after the irradiation with plasma under the above-mentioned conditions were measured, and the weight loss was calculated in accordance with the following equation.

$$\text{Weight loss (\%)} = \{(W0-W1)/W0\} \times 100\%$$

In each of Comparative Examples 2 to 5 and 7 to 8, the weight loss was high. It is assumed that this is caused by the falling out of the perfluororesin that was deposited on the surface of the sealing material.

[d] Compressive Permanent Strain of Sealing Material

A sample (AS214 O-ring) was sandwiched between iron plates in accordance with JIS K 6262 at a compression ratio of 25% and then warmed with an electric furnace under the conditions of 200° C. for 72 hours. Subsequently, the compression was released, then the sample was allowed to cool for 30 minutes, and then the compressive permanent strain of the sample was calculated in accordance with the following equation.

$$\text{Compressive permanent strain} = \{(T0-T1)/(T0-T2)\} \times 100\%$$

In the equation, T0 represents the height of the sample before the test; T1 represents the height of the sample after allowing to cool for 30 minutes; and T2 represents the thickness (height) of a spacer.

The invention claimed is:

1. A fluorine rubber composition comprising a hydrogen atom-containing fluorine rubber and a hydrogen atom-containing fluororesin, wherein the hydrogen atom-containing fluororesin is at least one compound selected from the group consisting of polyvinylidene fluoride, a vinylidene fluoride-hexafluoropropylene copolymer, and a tetrafluoroethylene-ethylene copolymer, and the fluorine rubber composition contains no inorganic filler.

2. The fluorine rubber composition according to claim 1, wherein a content of said hydrogen atom-containing fluororesin is 1 to 50 parts by weight relative to 100 parts by weight of said hydrogen atom-containing fluorine rubber.

3. The fluorine rubber composition according to claim 1, wherein the fluorine rubber composition further comprises an organic peroxide and a co-crosslinking agent.

4. A crosslinked rubber molded body comprising a crosslinked product of the fluorine rubber composition according to claim 1.

5. The crosslinked rubber molded body according to claim 4, wherein the crosslinked rubber molded body is a sealing material for semiconductor manufacturing devices.

6. A method for producing a crosslinked rubber molded body, the method comprising a step of crosslinking and molding the fluorine rubber composition according to claim 1.

7. A method for producing a crosslinked rubber molded body, the method comprising:

a first crosslinking step of partially crosslinking the fluorine rubber composition comprising a hydrogen atom-containing fluorine rubber and a hydrogen atom-containing fluororesin to produce a first crosslinked product that is capable of being molded; and a second crosslinking step of crosslinking said first crosslinked product with an ionizing radiation to produce a second crosslinked product.

8. The production method according to claim 7, wherein the production method further comprises a molding step of molding said first crosslinked product between said first crosslinking step and said second crosslinking step.

9. The production method according to claim 8, wherein said first crosslinked product is molded by extrusion molding or injection molding.

10. The production method according to claim 7, wherein said fluorine rubber composition is crosslinked with heat in said first crosslinking step.

\* \* \* \* \*